United States Patent
Kim et al.

(10) Patent No.: US 7,271,787 B2
(45) Date of Patent: Sep. 18, 2007

(54) LIQUID CRYSTAL DISPLAY PANEL

(75) Inventors: Young-Sik Kim, Kyoungsangbuk-Do (KR); Seong-Soo Hwang, Gyoungsangbuk-Do (KR); Dae-Lim Park, Kyoungsangbuk-Do (KR); Su-Hwan Moon, Gyoungsangbuk-Do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 538 days.

(21) Appl. No.: 10/669,712

(22) Filed: Sep. 25, 2003

(65) Prior Publication Data

US 2004/0125070 A1  Jul. 1, 2004

(30) Foreign Application Priority Data

Dec. 31, 2002  (KR) .................. 10-2002-0088457

(51) Int. Cl.
G09G 3/36 (2006.01)

(52) U.S. Cl. ...................... 345/87; 345/55; 345/204

(58) Field of Classification Search ............... 345/87, 345/55, 204
See application file for complete search history.

(56) References Cited

U.S. PATENT DOCUMENTS 5,990,492 A * 11/1999 Kim ........................... 257/59

FOREIGN PATENT DOCUMENTS

KR   2001-017399   5/2001

* cited by examiner

*Primary Examiner*—Richard Hjerpe
*Assistant Examiner*—Leonid Shapiro
(74) *Attorney, Agent, or Firm*—Morgan, Lewis & Bockius, LLP

(57) ABSTRACT

A liquid crystal display panel includes a first substrate, an image display part formed on the first substrate and having a plurality of pixels arranged thereon, a plurality of gate and source drivers for supplying signals to the pixels, a controller for supplying control signals to the gate and source drivers, at least one conductive line at a corner portion of the first substrate, the conductive line connecting the controller and the gate drivers, and a plurality of transparent electrode segments overlapping the conductive line with at least one intermediate film interposed therebetween.

8 Claims, 4 Drawing Sheets

LIQUID CRYSTAL DISPLAY PANEL

The present invention claims the benefit of Korean Patent Application No. P2002-088457 filed in Korea on Dec. 31, 2002, which is hereby incorporated by reference.

BACKGROUND OF THE INVENTION

1. Field of the Invention

The present invention relates to a display panel, and more particularly to a liquid crystal display panel.

2. Discussion of the Related Art

In general, a liquid crystal display device displays images by individually supplying data signals to liquid crystal cells arranged in a matrix configuration and controlling light transmittance of the liquid crystal cells. Accordingly, the liquid crystal display device includes a liquid crystal display panel with liquid crystal cells such that a unit of a pixel is arranged in the matrix configuration and a driving circuit for driving the liquid crystal cells.

The liquid crystal display panel includes a color filter substrate and a thin film transistor array substrate attached with a certain gap therebetween, and a liquid crystal material layer formed within the gap between the color filter substrate and the thin film transistor array substrate.

On the thin film transistor array substrate of the liquid crystal display panel, a plurality of data lines for transmitting image information to the liquid crystal cells and a plurality of gate lines for transmitting scan signals to the liquid crystal cells intersect, and liquid crystal cells are defined at every intersection of the data lines and gate lines.

A common electrode and a pixel electrode are formed facing inner surfaces of the color filter substrate and the thin film transistor array substrate to supply an electric field to the liquid crystal material layer. In addition, the pixel electrode is formed at every liquid crystal cell of the thin film transistor array substrate, while the common electrode is integrally formed at an entire surface of the color filter substrate. Accordingly, by controlling first voltages supplied to the pixel electrode in a state that the common electrode receives a second voltage, light transmittance of the liquid crystal cells can be individually controlled. In order to control the voltages supplied to the pixel electrode by the liquid crystal cells, each liquid crystal cell includes a thin film transistor used as a switching device.

The driving circuit includes a gate driving unit supplying a scan signal to the gate lines, a data driving unit supplying image information to the data lines, a timing controller controlling a driving timing of the gate driving unit and the data driving unit, and a power supply unit supplying various driving voltages used for a liquid crystal display device.

The timing controller controls a driving timing of the gate driving unit and the data driving unit through image information and a control signal supplied from an external graphic processor, and supplies image information to the data driving unit.

The power supply unit generates driving voltages, such as a common voltage (Vcom), a gate high voltage (Vgh), a gate low voltage (Vgl) or a gamma reference voltage (Vref) used for the liquid crystal display device by using power supplied from the external graphic processor. The power supply unit also supplies them to the gate driving unit, the data driving unit, a gamma voltage generator, and the liquid crystal display panel.

The gate driving unit sequentially supplies a scan signal to the gate lines so that the liquid crystal cells arranged in the matrix configuration can be selected line-by-line, and image information is supplied to the liquid crystal cells of the selected one line from the data driving unit by way of the data lines.

When the image information is individually supplied to the pixel electrode of the liquid crystal cells and the common voltage (Vcom) is supplied to the common electrode, a voltage difference occurs between the pixel electrode and the common electrode, according to which an electric field is supplied to the liquid crystal material layer. Thus, the light transmittance of the liquid crystal cells are individually controlled to display a desired image.

The data driving unit and the gate driving unit, which are directly connected to the liquid crystal display panel, are fabricated with a plurality of integrated circuits (IC). The data driving integrated circuits and the gate driving integrated circuits are mounted on a tape carrier package (TCP) and are connected to the liquid crystal display panel in a tape automated bonding (TAB) method. When the data driving integrated circuits are connected to the liquid crystal display panel in the TAB method through the tape carrier package, the tape carrier package is connected to a data printed circuit board (PCB), image information, control signals, and driving voltages are supplied from the timing controller and the power supply unit through the lines mounted on the data printed circuit board.

When the gate driving integrated circuits are connected to the liquid crystal display panel in the TAB method through the tape carrier package, the tape carrier package is connected to the gate printed circuit board, and control signals and driving voltages are supplied from the timing controller and the power supply unit through the lines mounted on the gate printed circuit board.

Currently, as the semiconductor process techniques and packaging techniques advance, a highly integrated and high performance semiconductor chip is required. Accordingly, a controller, which has been mounted on the gate printed circuit board, can be mounted on the data printed circuit board, thereby making one chip perform as a highly integrated, high performance semiconductor chip. Accordingly, the gate printed circuit board simply functions to transmit signals processed in the data printed circuit board.

FIG. 1 is a partial plan view of a liquid crystal display panel and a connection state of a driving unit according to the related art. In FIG. 1, the liquid crystal display panel includes a thin film transistor array substrate 10 and a color filter substrate 20 attached to each other in a facing manner, a gate tape carrier package 30 connected to a gate pad part of the thin film transistor array substrate 10, a data tape carrier package 40 connected to a data pad part of the thin film transistor array substrate 10, a gate printed circuit board 50 connected to the gate tape carrier package 30, and a data printed circuit board 60 connected to the data tape carrier package 40.

The data printed circuit board 60 includes a controller (not shown) for processing image information, control signals, and driving voltages. The controller is highly integrated and has high performance to process control signals and driving voltages to be supplied to the gate printed circuit board 50. Accordingly, the gate printed circuit board 50 has a simple function of transmitting the control signals and the driving voltages supplied from the data printed circuit board 60 to the gate pad part of the thin film transistor array substrate 10 through the gate tape carrier package 30.

In order to supply the control signals and the driving voltages from the data printed circuit board 60 to the gate printed circuit board 50, connectors 55 and 65 are formed at the gate printed circuit board 50 and the data printed circuit board 60, respectively. The connectors 55 and 65 formed at the gate printed circuit board 50 and the data printed circuit board 60 are respectively electrically connected by a flexible plate cable (FPC) 70.

However, the liquid crystal display device has the following disadvantages. First, since the connectors 55 and 65 are respectively formed on the thin gate printed circuit board 50 and the data printed circuit board 60, a thickness of the liquid crystal display device becomes as high as the thickness of the connectors 55 and 65, thereby impeding fabrication of a thin liquid crystal display device.

Second, in order to electrically connect the connectors 55 and 65, the flexible plate cable 70 should be installed, which increases the number of processes for fabrication of a liquid crystal display device as well as its production cost. Thus, a liquid crystal display device of a line-on-glass method has been proposed in which lines for supplying control signals and driving voltages from the data printed circuit board 60 to the gate printed circuit board 50 are mounted at an outer dummy region of the thin film transistor array substrate 10.

FIG. 2 is a partial plan view of a liquid crystal display panel using a line-on-glass method and a connection state of a driving unit according to the related art. In FIG. 2, a liquid crystal display panel of a line-on-glass method includes a thin film transistor array substrate 110 and a color filter substrate 120 attached to each other in a facing manner, a gate tape carrier package 130 connected to a gate pad part of the thin film transistor array substrate 110, a data tape carrier package 140 connected to a data pad part of the thin film transistor array substrate 110, a gate printed circuit board 150 connected to the gate tape carrier package 130, and a data printed circuit board 160 connected to the data tape carrier package 140.

The data printed circuit board 160 includes a controller for processing image information, control signals, and driving voltages. The controller is highly integrated to process control signals and driving voltages to be supplied to the gate printed circuit board 150. Accordingly, the gate printed circuit board 150 has a simple function of transmitting the control signals and the driving voltages supplied from the data printed circuit board 160 to the gate pad part of the thin film transistor array substrate 110 through the gate tape carrier package 130.

In general, the liquid crystal display panel is constructed such that the thin film transistor array substrate 110 and the color filter substrate 120 are attached with a predetermined gap therebetween in a facing manner, and a liquid crystal material layer is formed in the gap. One shorter side and one longer side of the thin film transistor array substrate 110 protrude compared to the color filter substrate 120, and a gate pad part electrically connected to the gate lines of the thin film transistor array substrate 110 and a data pad part electrically connected to the data lines of the thin film transistor array substrate 110 are formed at the protruded region.

The gate pad part and the data pad part are formed corresponding to an effective image display part of the attached thin film transistor array substrate 110 and the color filter substrate 120. Accordingly, the corner portion where one short side and one longer side of the thin film transistor array substrate 110 meet is a dummy region and provides no real purpose for the liquid crystal display panel. However, in the liquid crystal display panel of the line-on-glass method using the dummy region, line-on-glass lines 111 are mounted on the corner portion where one short side and one longer side of the thin film transistor array substrate 110 meet in order to supply control signals and driving voltages from the data printed circuit board 160 to the gate printed circuit board 150. Thus, the connectors 55 and 65 of FIG. 1 do not need to be respectively formed on the gate printed circuit board 150 and the data printed circuit board 160, wherein the flexible plate cable 70 for electrically connecting the connectors 55 and 65 is not required.

Driving voltages supplied to the gate printed circuit board 150 through the line-on-glass lines 111 include DC signals, such as a gate high voltage (Vgh), a gate low voltage (Vgl), a common voltage (Vcom), a ground voltage (GND), and a power supply voltage (Vcc). Similarly, control signals supplied to the gate printed circuit board 150 through the line-on-glass lines 111 include AC signals, such as a gate start pulse (GSP), a gate shift clock (GSC), and a gate enable signal (GOE). Usually, the line-on-glass lines 111 are simultaneously patterned and formed during the process of forming gate lines and gate electrodes on the thin film transistor array substrate 110.

FIG. 3 is a partial plan view of an enlarged region where line-on-glass lines are formed on the thin film transistor array substrate of FIG. 2 according to the related art. In FIG. 3, line-on-glass lines 111A~111C are formed regularly spaced apart at the corner portion where one shorter side and one longer side of the thin film transistor array substrate 110 meet. The line-on-glass lines 111A~111C are simultaneously patterned and formed during the process of forming the gate lines and the gate electrodes on the thin film transistor array substrate 110. In addition, a seal pattern 112 is formed at the region of the thin film transistor array substrate 110 where the line-on-glass lines 111A~111C are formed. The seal pattern 112 is formed along an outer edge of an image display region of the liquid crystal display panel to attach the thin film transistor array substrate 110 and a color filter substrate (i.e., 120 in FIG. 2).

FIG. 4 is an cross sectional view along I-I' of FIG. 3 according to the related art. The liquid crystal display panel of the line-on-glass method and its fabrication method will now be described in detail with reference to FIG. 4.

First, line-on-glass lines 211A~211C are patterned regularly spaced apart at an upper surface of a thin film transistor array substrate 210, wherein the line-on-glass lines 211A~211C are simultaneously patterned and formed during the process of forming gate lines and gate electrodes on the thin film transistor array substrate 210.

A gate insulation film 220 and an active layer 230 are sequentially formed at the upper surface of the thin film transistor array substrate 210 with the line-on-glass lines 211A~211C patterned regularly spaced apart thereon. The gate insulation film 220 and the active layer 230 are sequentially formed to form a thin film transistor at an image display part of the thin film transistor array substrate 210, and although not shown in the drawing, on the image display part, the active layer 230 is patterned and then data lines and source/drain electrodes of the thin film transistor are simultaneously patterned.

At a portion of the active layer 230 where the thin film transistor of the image display part is formed, a semiconductor layer made of amorphous silicon and an ohmic contact layer made of n+ amorphous silicon doped with phosphor at a high concentration are consecutively deposited and patterned. Then, when the data lines and the source/drain electrodes are patterned, the exposed ohmic contact layer is removed to work as a channel of the thin film transistor. Accordingly, the ohmic contact layer is removed at the region other than the lower portions of the data lines and the source/drain electrodes, leaving only the semiconductor layer.

A passivation film 240 is formed at an upper surface of the active layer 230, and is made of an inorganic material as a thin film, such as SiNx or SiOx. However, in order to improve an aperture ratio of the liquid crystal display device, an organic material, such as benzocyclobutene (BCB), a spin-on-glass (SOG) or photoacryl, is applied as a thick film The passivation film 240 is selectively etched to form a drain contact hole exposing a portion of the drain electrode, and the exposed drain electrode electrically contacts a pixel electrode provided in a unit pixel through the drain contact hole. Since the organic material, such as benzocyclobutene (BCB), a spin-on-glass (SOG) or photoacryl, are used for the passivation film 240, a dry etching is performed to form the drain contact hole.

The passivation film 240, which is made of an organic material, does not have good bonding characteristics as a thick film with respect to a seal pattern to be formed in a follow-up process. Moreover, the attached thin film transistor array substrate 210 and the color filter substrate (120 in FIG. 2) may crack or moisture may permeate into the image display part, causing defects in the liquid crystal display panel. Thus, in order to improve the adhesive force with respect to a seal pattern 270, when the drain contact hole is formed, the passivation film 240 at the region where the line-on-glass lines 211A~211C are formed is simultaneously dry-etched to form a plurality of bonding holes 250. Accordingly, the active layer 230 formed at the lower side of the passivation film 240 is also etched as being affected by the dry-etching of the passivation film 240, so that the gate insulation film 220 is exposed at the bottom surface of the bonding holes 250.

In addition, pixel electrodes 260A~260C overlapping correspondingly with the line-on-glass lines 211A~211C are patterned at an upper portion of a resulting structure upon which the gate insulation film 220, the passivation film 240, and the bonding holes 250 have been formed. The pixel electrodes 260A~260C are provided in the unit pixel at the region where the thin film transistor of the image display part is formed, and patterned by wet-etching so as to electrically contact the drain electrode through the drain contact hole formed at the passivation film 240, and they are patterned to overlap correspondingly with the line-on-glass lines 211A~211C at the region where the line-on-glass lines 211A~211C are formed.

The reason for patterning the pixel electrode 260A~260C to overlap correspondingly with the line-on-glass lines 211A~211C is as follows. If the dry-etching is excessively performed in forming the bonding holes 250 at the passivation film 240, the gate insulation film 220 exposed at the bottom surface of the bonding holes 250 would be etched also by being affected by the dry-etching of the passivation film 240, exposing the line-on-glass lines 211A~211C formed at the lower side of the gate insulation film 220 at the bottom surface of the bonding holes 250.

In this state, if the pixel electrodes 260A~260C are removed through a wet-etching at the region where the line-on-glass lines 211A~211C have been formed, the line-on-glass lines 211A~211C exposed through the bonding holes 250 would be etched by the wet-etching of the pixel electrodes 260A~260C.

When the line-on-glass lines 211A~211C are partially etched and damaged, characteristics of electric signals transmitted through the line-on-glass lines 211A~211C would be changed. In a worst case, the line-on-glass lines 211A~211C are electrically opened to cause a driving deficiency or a degradation of a picture quality of a liquid crystal display device.

Therefore, in order to prevent such problems, the pixel electrodes 260A~260C are widely patterned to correspondingly overlap with the line-on-glass lines 211A~211C. However, even though the pixel electrodes 260A~260C are widely patterned to correspondingly overlap with the line-on-glass lines 211A~211C, the following problems arise. That is, as mentioned above, if the dry-etching is excessively performed in forming the bonding holes 250 at the passivation film 240, the gate insulation film 220 exposed at the bottom surface of the bonding holes 250 is also etched the dry-etching of the passivation film 240.

Then, the line-on-glass lines 211A~211C formed at the lower side of the gate insulation film 220 are exposed at the bottom surface of the bonding holes 250, thereby electrically contacting the pixel electrodes 260A~260C. The result is that characteristics of electric signals transmitted through the line-on-glass lines 211A~211C may be changed.

Since the pixel electrodes 260A~260C are patterned widely so as to correspondingly overlap with the line-on-glass lines 211A~211C, for example, even if the line-on-glass line 211A and the pixel electrode 260A electrically contact at one bonding hole 250, the entire area of the pixel electrode 260A widely patterned to correspondingly overlap with the line-on-glass line 211A contacts the line-on-glass line 211A. Thus, characteristics of an electric signal transmitted through the line-on-glass line 211A can be severely changed.

In addition, due to the pixel electrodes 260A~260C so widely patterned as to correspondingly overlap with and contact the line-on-glass lines 211A~211C, if a conductive foreign material (e.g., residual Ag dot) is adsorbed on the region of the thin film transistor array substrate 210 where the line-on-glass lines 211A~211C are formed, an electrical short occurs as the line-on-glass lines 211A~211C contact each other, resulting in a defective liquid crystal display device.

Moreover, since the pixel electrodes 260A~260C are so widely patterned as to correspondingly overlap with the line-on-glass lines 211A~211C and electrically contact the line-on-glass lines 211A~211C, if, for example, a gate low voltage (Vgl) of −5V is transferred to the line-on-glass line 211C, −5V voltage is applied the pixel electrode 260C contacting electrically the line-on-glass line 211C.

Then, an electrolytic corrosion occurs between the pixel electrode 260C that has received −5V and a black matrix made of Cr formed on the color filter substrate. Because the pixel electrode 260C are so widely patterned to correspondingly overlap with the line-on-glass line 211C, the electrolytic corrosion becomes severe.

SUMMARY OF THE INVENTION

Accordingly, the present invention is directed to a liquid crystal display panel and method of fabricating the same that substantially obviates one or more of the problems due to limitations and disadvantages of the related art.

An object of the present invention is to provide a liquid crystal display panel having reduced electrolytic corrosion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, 1 liquid crystal display panel includes a first substrate, an image display part formed on the first substrate and having a plurality of pixels arranged thereon, a plurality of gate and source drivers for supplying signals to the pixels, a controller for supplying control signals to the gate and source drivers, at least one conductive line at a corner portion of the first substrate, the conductive line connecting the controller and the gate drivers, and a plurality of transparent electrode segments overlapping the conductive line with at least one intermediate film interposed therebetween.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
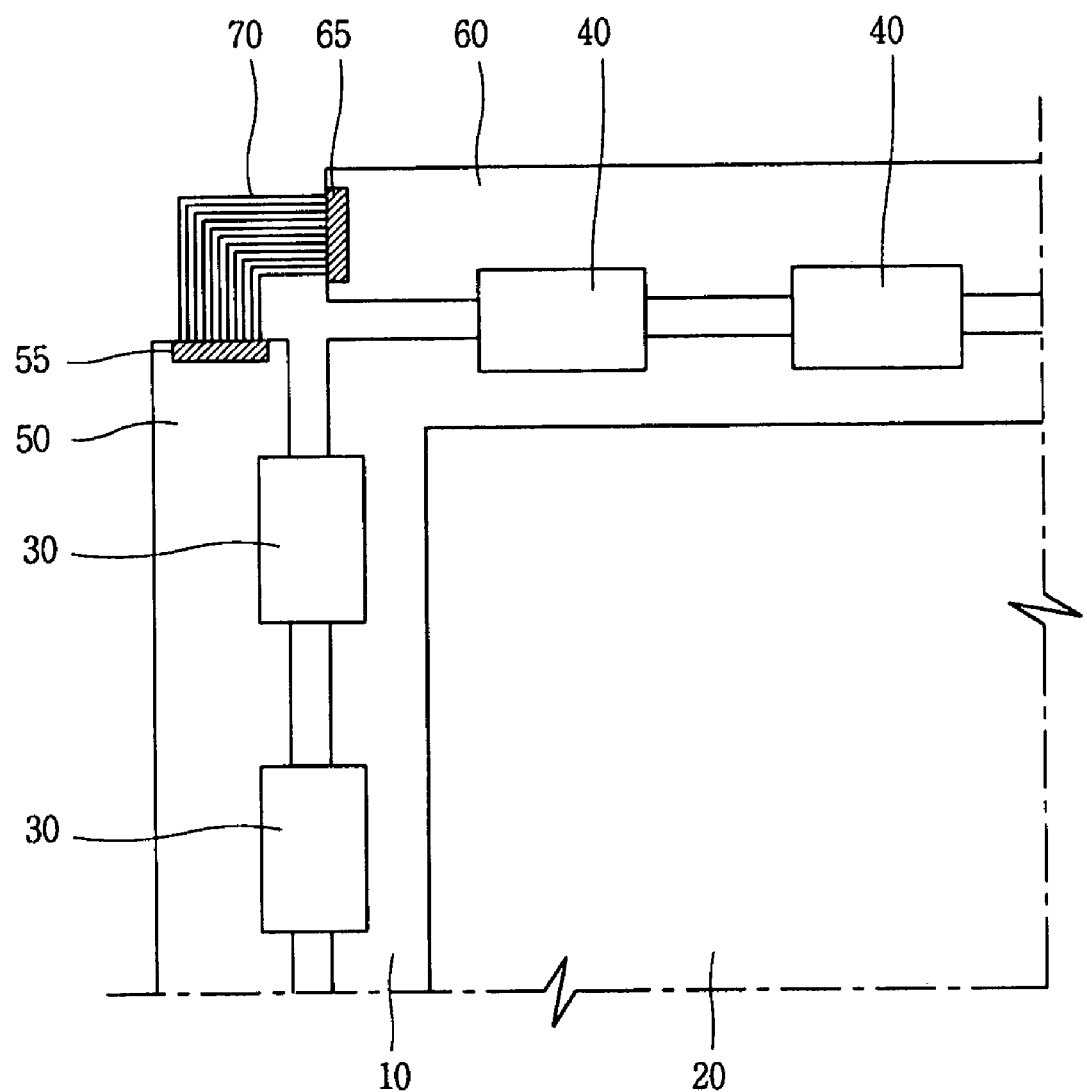
FIG. 1 is a partial plan view of a liquid crystal display panel and a connection state of a driving unit according to the related art.
Figure 2:
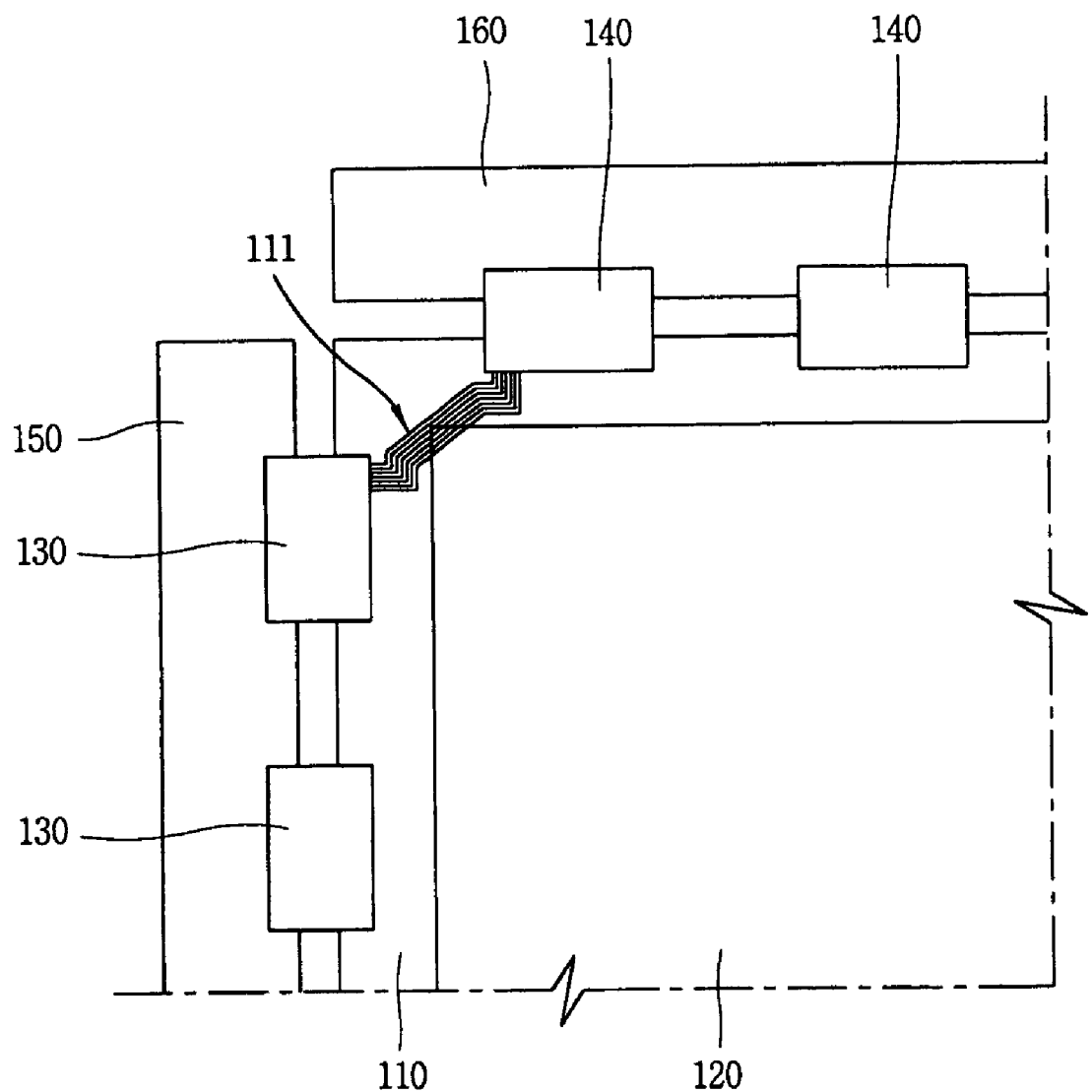
FIG. 2 is a partial plan view of a liquid crystal display panel using a line-on-glass method and a connection state of a driving unit according to the related art.
Figure 3:
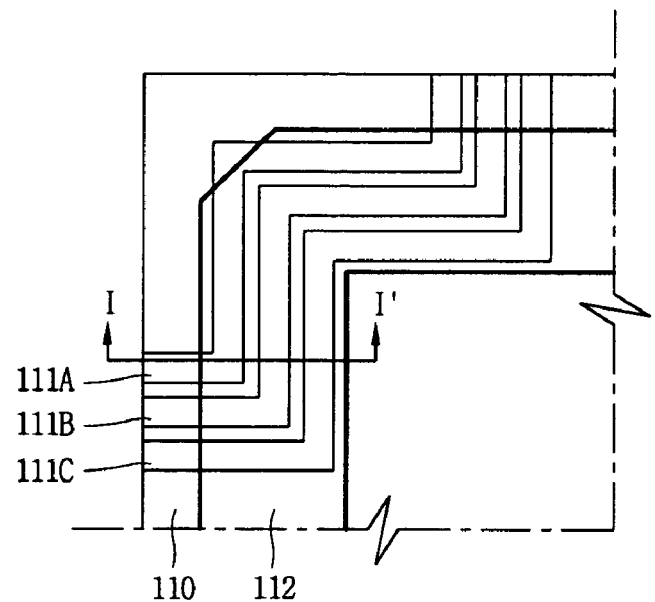
FIG. 3 is a partial plan view of an enlarged region where line-on-glass lines are formed on the thin film transistor array substrate of FIG. 2 according to the related art.
Figure 4:
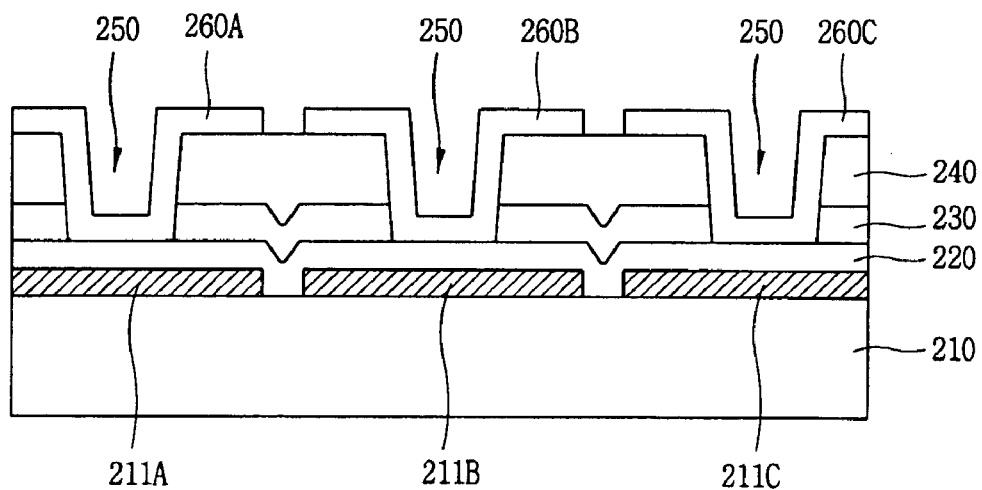
FIG. 4 is a cross sectional view along I-I' of FIG. 3 according to the related art.
Figure 5:
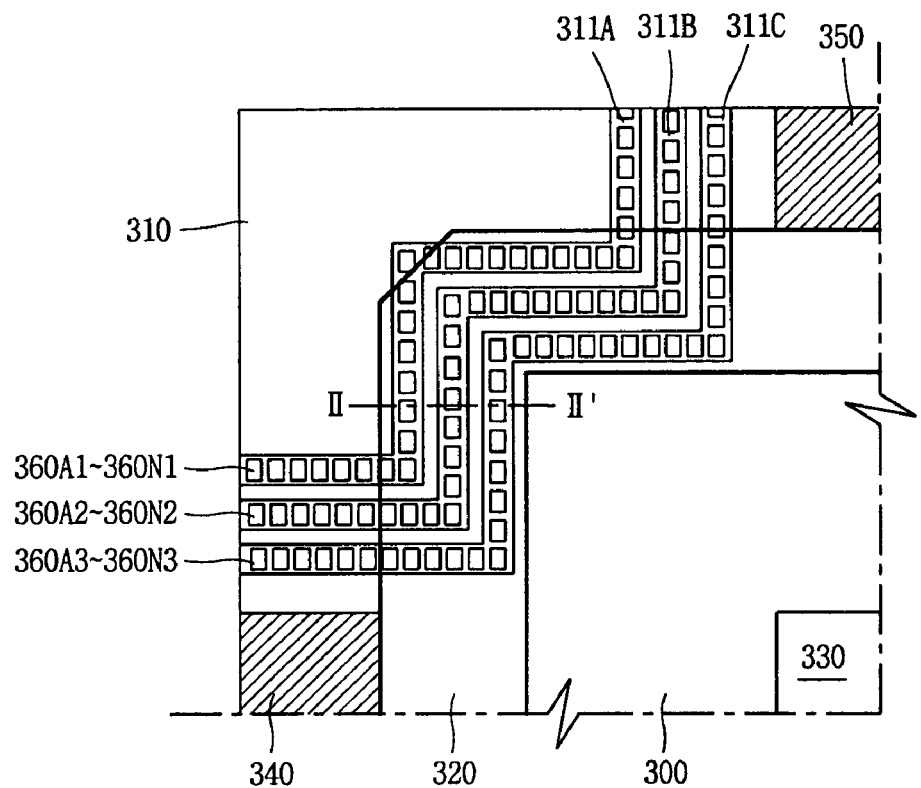
FIG. 5 is partial plan view of an exemplary liquid crystal display panel according to the present invention.

FIG. 5 is partial plan view of an exemplary liquid crystal display panel according to the present invention. In FIG. 5, a first substrate 310 and a second substrate 320 may be attached together such that one shorter side and one longer side of the first substrate 310 may protrude, and an image display part 330, upon which a plurality of pixels may be arranged in a matrix configuration, may be formed within the region where the first substrate 310 and the second substrate 320 are attached together. For example, the first substrate 310 may be a thin film transistor (TFT) array substrate of the liquid crystal display panel, and the second substrate 320 may be a color filter (CF) substrate.

Accordingly, on the first substrate 310 of the image display part 330, a plurality of gate lines may be arranged along a horizontal direction and may be regularly isolated, a plurality of data lines may be arranged along a vertical direction and may be regularly isolated, and a plurality of pixels may be defined at every intersection of the gate lines and the data lines in a matrix configuration. In addition, each pixel may have a TFT as a switching device and a pixel electrode connected to the TFT.

The thin film transistor may include a gate electrode that may be simultaneously patterned with the gate lines so as to be electrically connected to the gate lines, a source electrode that may be simultaneously patterned with the data lines so as to be electrically connected to the data lines, and a drain electrode that may be simultaneously patterned with the data lines and the source electrode so as to be electrically connected to the pixel electrode.

At the second substrate 320 of the image display part 330, there are provided red, green, and blue color filters coated separately in each pixel by a black matrix, and a common electrode, which is a counter electrode of the pixel electrode, formed at the first substrate 310. The first substrate 310 and the second substrate 320 maybe attached together by a seal pattern 300 formed along an outer edge of the image display part 330. Accordingly, randomly scattered spacer balls may be provided or patterned spacers may be formed through photolithographic processes on the first substrate 310 or on the second substrate 320, thereby providing a certain space between the first substrate 310 and the second substrate 320, wherein a liquid crystal material layer is formed within the space.

At the protruded shorter side of the first substrate 310, a gate pad part 340 may be formed at a region corresponding to the image display part 330, and may be electrically connected to the gate lines for supplying driving signals to the gate lines. At the protruded longer side of the first substrate 310, a data pad part 350 may be formed at a region corresponding to the image display part 330, and may be electrically connected to the data lines for supplying image information to the data lines.

At the corner portion where the protruded shorter side and longer side of the first substrate 310 meet, line-on-glass lines 311A~311C may be mounted to transmit DC signals, such as a gate high voltage (Vgh), a gate low voltage (Vgl), a common voltage (Vcom), a ground voltage (GND), and a power supply voltage (Vcc), and AC signals, such as a gate start pulse (GSP), a gate shift clock (GSC), and a gate enable signal (GOE). The line-on-glass lines 311A~311C may be simultaneously patterned and formed during the process of forming the gate lines and the gate electrodes on the first substrate 310.

A plurality of pixel electrodes 360A1~360N1, 360A2~360N2, and 360A3~360N3 may be patterned with at least one intermediate film (not shown) interposed therebetween to overlap with each of the line-on-glass lines 311A~311C, and the plurality of pixel electrodes 360A1~360N1, 360A2~360N2, and 360A3~360N3 may be patterned to be isolated from each other.

Figure 6:
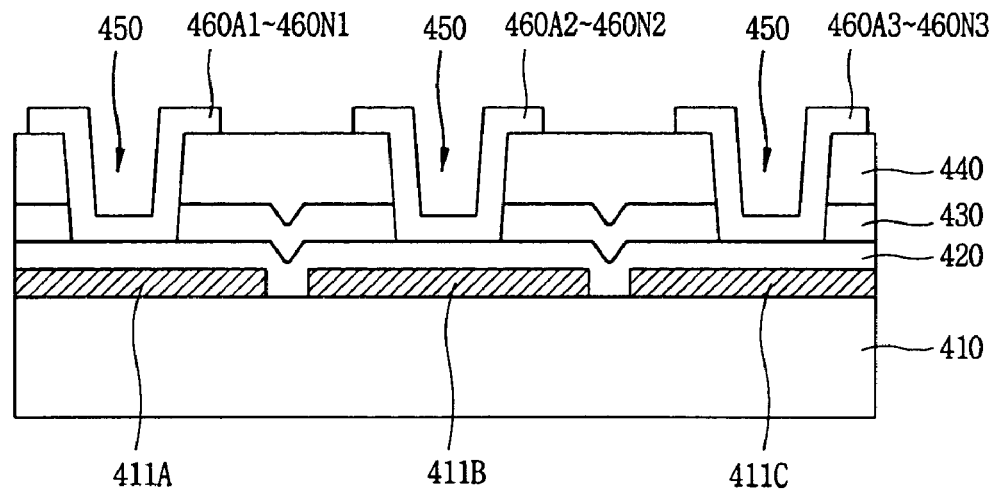
FIG. 6 is a cross sectional view along II-II' of FIG. 5 according to the present invention.

FIG. 6 is a cross sectional view along II-II' of FIG. 5 according to the present invention. The liquid crystal display panel of the line-on-glass method and its fabrication method in accordance with the present invention will now be described. First, line-on-glass lines 411A~411C may be patterned at regular intervals at an upper surface of the first substrate 410, wherein the line-on-glass lines 411A~411C may be simultaneously patterned during the process of forming the gate lines and the gate electrodes at the image display part of the first substrate 410.

Next, a gate insulation film 420 and an active layer 430 may be sequentially formed at an upper surface of the first substrate 410 with the line-on-glass lines 411A~411C patterned at regular intervals thereon. The gate insulation film 420 and the active layer 430 may be sequentially formed to form a thin film transistor at the image display part of the first substrate 410, and although not shown, on the image display part, after the active layer 430 has been patterned, the data lines and the source/drain electrodes may be simultaneously patterned.

At a region of the active layer 430 where the thin film transistor of the image display part is formed, a semiconductor layer made of amorphous silicon and an ohmic contact layer made of n+ amorphous silicon doped with phosphor at high concentration may be successively deposited and patterned. When the data lines and source/drain electrodes are patterned, the exposed ohmic contact layer may be removed to work as a channel of the thin film transistor. Accordingly, as the ohmic contact layer is removed at the region other than the lower portions of the data lines and source/drain electrodes, only the semiconductor layer remains.

Then, a passivation film 440 may be formed at an upper surface of the active layer 430, wherein the passivation film 440 may include an organic material, such as benzocyclobutene (BCB), an SOG, or a photo-acryl with a low dielectric constant, by which an aperture ratio of the liquid crystal display device may be improved. The passivation film 440 may be selectively etched to form a drain contact hole exposing a portion of the drain electrode, and the drain electrode may electrically contact the pixel electrode provided at the unit pixel through the drain contact hole. Since the organic material, such as benzocyclobutene (BCB), an SOG, or a photo-acryl with a low dielectric constant, may be applied to form the passivation film 440, a dry-etching may be performed to form the drain contact hole.

The passivation film 440 made of an organic material formed as a thick film may not have good bonding characteristics with respect to the seal pattern to be formed in a follow-up process, thus the attached first substrate 410 and the second substrate (320 in FIG. 5) may crack or moisture may permeate into the image display part, causing defects in the liquid crystal display panel. Thus, in order to improve the adhesive force with respect to a seal pattern, when the drain contact hole is formed, the passivation film 440 at the region where the line-on-glass lines 411A~411C are formed may be simultaneously dry-etched to form a plurality of bonding holes 450. Accordingly, the active layer 430 formed at the lower portion of the passivation film 440 may also be etched as being affected by the dry-etching of the passivation film 440, so that the gate insulation film 420 is exposed at the bottom surface of the bonding holes 450.

In addition, pixel electrodes 460A1~460N1, 460A2~460N2, and 460A3~460N3 correspondingly overlap with the line-on-glass lines 411A~411C may be patterned at an upper portion of a resulting structure so that the gate insulation film 420, the passivation film 440, and the bonding holes 250 have been formed. The pixel electrodes 460A1~460N1, 460A2~460N2, and 460A3~460N3 may be provided in the unit pixel at the region where the thin film transistor of the image display part is formed, and patterned by wet-etching so as to electrically contact the drain electrode through the drain contact hole formed at the passivation film 440. Accordingly, they may be patterned to correspondingly overlap with the line-on-glass lines 411A~411C at the region where the line-on-glass lines 411A~411C may be formed.

The reason for patterning the pixel electrode 460A1~460N1, 460A2~460N2, and 460A3~460N3 to correspondingly overlap with the line-on-glass lines 411A~411C is as follows. If the dry-etching is excessively performed in forming the bonding holes 450 at the passivation film 440, the gate insulation film 420 exposed at the bottom surface of the bonding holes 450 would be etched by the dry-etching of the passivation film 440, exposing the line-on-glass lines 411A~411C formed at the lower side of the gate insulation film 420 at the bottom surface of the bonding holes 450.

If the pixel electrodes 460A1~460N1, 460A2~460N2, and 460A3~460N3 are removed through a wet-etching at the region where the line-on-glass lines 411A~411C have been formed, the line-on-glass lines 411A~411C exposed through the bonding holes 450 would be etched by the wet-etching of the pixel electrodes 460A1~460N1, 460A2~460N2, and 460A3~460N3.

If the line-on-glass lines 411A~411C are partially etched and damaged, characteristics of electric signals transmitted through the line-on-glass lines 411A~411C would be changed. In a worst case, the line-on-glass lines 411A~411C will be disconnected to cause a driving deficiency or a degradation of a picture quality of a liquid crystal display device. Therefore, in order to prevent such problems, the pixel electrodes 460A1~460N1, 460A2~460N2, and 460A3~460N3 are widely patterned to correspondingly overlap with the line-on-glass lines 411A~411C. Therefore, even if the dry-etching is excessively performed in forming the bonding holes 450 at the passivation film 440 and thus the line-on-glass lines 411A~411C are exposed at the bottom surface of the bonding holes 450 to electrically contact the pixel electrodes 460A1~460N1, 460A2~460N2, and 460A3~460N3, change of characteristics of electric signals transmitted through the line-on-glass lines 411A~411C can be minimized.

In other words, the pixel electrodes 460A1~460N1, 460A2~460N2, and 460A3~460N3 are patterned to be electrically insulated, so that even if, for example, the pixel electrode 460A1 and the line-on-glass line 411A electrically contact in one bonding hole 450, only the area corresponding to the pixel electrode 460A1 is in electrical contact with the line-on-glass line 411A. Thus, change of characteristics of an electric signal transmitted through the line-on-glass line 411A can be considerably reduced compared to the related art.

In addition, since the pixel electrodes 460A1~460N1, 460A2~460N2, and 460A3~460N3 are patterned and electrically insulated, even if a conductive foreign material (e.g., a residual silver dot) is formed on the first substrate 410 of the region where the line-on-glass lines 411A~411C have been formed, short occurrence that line-on-glass lines 411A~411C are in contact electrically can be minimized.

Moreover, because the pixel electrodes 460A1~460N1, 460A2~460N2, and 460A3~460N3 are patterned and electrically insulated, the electrolytic corrosion can be mitigated. For example, if a gate low voltage (Vgl) of −5V is transmitted through the line-on-glass line 411C and the pixel electrode 460N3 is in contact electrically with the line-on-glass line 411C, −5V is supplied to the pixel electrode 460N3.

Accordingly, when the electrolytic corrosion occurs between the pixel electrode 460N3, which has received −5V, and a black matrix made of Cr that may be formed on the color filter substrate, −5V is supplied only to the area corresponding to the pixel electrode 460N3. Thus, the electrolytic corrosion can be considerably reduced compared to the related art.

It will be apparent to those skilled in the art that various modifications and variations can be made in the liquid crystal display panel and fabricating method thereof of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprising:
   a first substrate;
   an image display part formed on the first substrate and having a plurality of pixels arranged thereon;
   a plurality of gate and source drivers for supplying signals to the pixels;
   a controller for supplying control signals to the gate and source drivers;
   at least one conductive line at a corner portion of the first substrate, the conductive line connecting the controller and the gate drivers; and
   a plurality of transparent electrodes along the extension direction of the corresponding conductive line to be overlapped with the conductive line with at least one intermediate film interposed therebetween, each transparent electrode being divided into a plurality of transparent electrode segments isolated from each other in the extension direction of the corresponding conductive line.

2. The panel according to claim 1, wherein a direction of the conductive line is parallel with a direction of the overlapping transparent electrode segments.

3. The panel according to claim 1, wherein the conductive line transmits DC signals including a gate high voltage (Vgh), a gate low voltage (Vgl), a common voltage (Vcom), a ground voltage (GND), and a power supply voltage (Vcc), and transmit AC signals including a gate start pulse (GSP), a gate shift clock (GSC), and a gate enable signal (GOE).

4. The panel according to claim 1, wherein the intermediate film includes a gate insulation film.

5. The panel according to claim 1, wherein the intermediate film includes at least one layer of a gate insulation film, a semiconductor layer, and a passivation film.

6. The panel according to claim 5, wherein the passivation film includes an organic material having at least one of benzocyclobutene (BCB), a spin-on-glass (SOG), and photoacryl.

7. The panel according to claim 1, wherein a pixel electrode is applied as the transparent electrode.

8. The liquid crystal display panel according to claim 1, further comprising a seal pattern attaching the first substrate and a second substrate together within a seal pattern region such that a portion of the conductive line is within the seal pattern region.

* * * * *